(12) United States Patent
Wang

(10) Patent No.: US 10,684,445 B2
(45) Date of Patent: Jun. 16, 2020

(54) ONE-HAND LENS ADJUSTMENT DEVICE FOR SCOPE

(71) Applicants: Songquan Wang, Nantong, Jiangsu (CN); Min Lai, Shenzhen, Guangdong (CN); Quanjun Luo, Shenzhen, Guangdong (CN); Gregory Palatnik, Shenzhen, Guangdong (CN); Derek Phillips Mehl, Shenzhen, Guangdong (CN)

(72) Inventor: Songquan Wang, Nantong (CN)

(73) Assignees: Songquan Wang, Nantong, Jiangsu (CN); Min Lai, Shenzhen, Guangdong (CN); Quanjun Luo, Shenzhen, Guangdong (CN); Gregory Palatnik, Shenzhen, Guangdong (CN); Derek Phillips Mehl, Shenzhen, Guangdong (CN)

( * ) Notice: Subject to any disclaimer, the term of this patent is extended or adjusted under 35 U.S.C. 154(b) by 317 days.

(21) Appl. No.: 15/784,177

(22) Filed: Oct. 15, 2017

(65) Prior Publication Data
US 2019/0113707 A1    Apr. 18, 2019

(51) Int. Cl.
| G02B 7/04 | (2006.01) |
| F41G 1/38 | (2006.01) |
| G02B 7/02 | (2006.01) |
| G02B 23/16 | (2006.01) |
| F41G 1/28 | (2006.01) |

(52) U.S. Cl.
CPC ............... *G02B 7/04* (2013.01); *F41G 1/28* (2013.01); *F41G 1/38* (2013.01); *G02B 7/021* (2013.01); *G02B 23/16* (2013.01)

(58) Field of Classification Search
CPC .......... G02B 7/04; G02B 7/021; G02B 23/16; F41G 1/28; F41G 1/38
USPC .......................................................... 359/422
See application file for complete search history.

(56) References Cited

U.S. PATENT DOCUMENTS

| 4,986,645 | A | * | 1/1991 | Ekstrand | F41G 1/38 |
| | | | | | 359/422 |
| 5,630,771 | A | * | 5/1997 | Weber | G02B 7/04 |
| | | | | | 359/822 |
| 8,314,994 | B1 | * | 11/2012 | Thomas | G02B 23/145 |
| | | | | | 359/676 |
| 2002/0176180 | A1 | * | 11/2002 | Ue | G02B 7/021 |
| | | | | | 359/819 |
| 2006/0254115 | A1 | * | 11/2006 | Thomas | F41G 1/38 |
| | | | | | 42/122 |

(Continued)

*Primary Examiner* — Collin X Beatty
(74) *Attorney, Agent, or Firm* — Raymond Y. Chan; David and Raymond Patent Firm

(57) ABSTRACT

A lens adjustment device for a scope includes an elongated tubular body having an objective end portion and an eyepiece end portion so as to define a rotation axial therealong, a first lens group and a second lens group slidably and operatively assembled at the objective end portion and the eyepiece end portion respectively, a first controller arranged for controlling the first lens group and the second lens group, and a second controller arranged for controlling the second lens group individually. The first controller and the second controller are arranged adjacently with each other on the outer tubular casing of the scope facilitating the adjustment operation of the scope so as to enable one-hand operation.

19 Claims, 12 Drawing Sheets

(56) References Cited

U.S. PATENT DOCUMENTS

| | | | |
|---|---|---|---|
| 2010/0014160 A1* | 1/2010 | Yang | G02B 23/16 |
| | | | 359/399 |
| 2015/0268459 A1* | 9/2015 | Zheng | G02B 23/145 |
| | | | 359/422 |
| 2016/0231554 A1* | 8/2016 | Tang | G02B 7/04 |
| 2018/0024376 A1* | 1/2018 | Dohr | F41G 1/345 |
| 2018/0224652 A1* | 8/2018 | Havens | G02B 27/283 |

* cited by examiner

ONE-HAND LENS ADJUSTMENT DEVICE FOR SCOPE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a sighting device, and more particularly to a one-hand lens adjustment device for scope, wherein the controllers of the lens adjustment device are arranged adjacently to each other, enabling the optical parameters of the scope to be adjusted conveniently by a user in a one-handed operation.

Description of Related Arts

A conventional firearm, such as a rifle, is usually equipped with various firearm accessories to assist the operator in accurately aiming at the target for shooting. For example, a scope is a sighting device commonly paired with firearms to provide an accurate aiming point and to aid the operator in properly aligning the barrel of the firearm with the desired target. Generally, a scope comprises a tubular lens housing for accommodating a plurality of lenses therein, commonly including an objective lens and an ocular assembled at the two ends of the lens housing, respectively.

The objective lens mounted at the objective end of the lens housing is adapted for transmitting and focusing light from the exterior of the scope, which is the first optical element contributing to the optical parameters of the scope. Further, the light captured by the objective lens is then transmitted to the ocular lens of the ocular assembly mounted at the opposed eyepiece end of the lens housing, by which the image captured by the objective lens is magnified thereby. As such the shooter is able to telescopically observe the target at a distance and perform shooting from a position far away from where the target is positioned. In other words, the ocular assembly is another optical element affecting the optical parameters of the scope.

It is well known that optical parameters should be adjusted prior to launching the shooting procedure of the firearm for acquiring an accurate aiming point towards a desired target. Conventionally, the controllers for adjusting the objective lens and ocular lens are constructed separately and apart, for example, at the two end portions of the tubular housing, or even with the ocular housing on one end portion with the focus (objective) adjustment centrally on the side and not in line with the ocular adjustment, such that the user has to separately adjust the controllers of the objective lens and the ocular assembly in turn, which is quite troublesome. More specifically, as the controllers of the optical lenses are placed far from one another on the lens housing, a significant distance exists between the two points of necessary manipulation, such that the user has to move his or her hand and fingers from the control switch of one of the lens controllers to the other for individual adjustment. Moreover, generally, such operation must be performed back and forth several times until eventually the optimal optical parameters of the scope are reached.

In addition, the optical parameters of the scope are codetermined by the objective lens and the ocular assembly while neither of the control switches is able to control both of them, in such a manner that the adjustment efficiency of the scope is substantially lowered, while the adjustment operation is kept at a difficult level. As such, a traditional magnification and focus adjustment setup puts the scope user at a disadvantage due to slow target acquisition, stemming from time lost on manual optical optimization.

SUMMARY OF THE PRESENT INVENTION

An object of the present invention is to provide a lens adjustment device for a scope, which comprises an elongated tubular body, having an objective end portion and an eyepiece end portion, for operatively and spacedly mounting a first optical lens group and a second lens group therein at two end portions thereof respectively, wherein the controllers of the first optical lens group and the second lens group are arranged adjacently enabling the optical parameters of the scope to be adjusted conveniently in one-hand operation.

Another object of the present invention is to provide a lens adjustment device for a scope, wherein a single controller of the lens adjustment device is capable of adjusting the first optical lens group and a second lens group simultaneously, thereby enhancing the adjusting efficiency thereof while the adjusting operation thereof is substantially simplified.

Another object of the present invention is to provide a lens adjustment device for a scope, wherein the first lens group communicates operatively with the second lens group via a relatively simple mechanical arrangement thereby not necessitating any expensive or complicated structures or components employed in establishing the arrangement between the first lens group and the second lens group.

Another object of the present invention is to provide a lens adjustment device for a scope, wherein the controllers of the optical lens groups are located adjacently to one another at the eyepiece end portion of the tubular body, such that the user no longer has to move his or her hand and fingers from one controller to the other for individual adjustment, while allowing the user to simultaneously observe changes within the field of view in real time.

Another object of the present invention is to provide a lens adjustment device for a scope, wherein since the user no longer needs to move his or her hands or hand and fingers back and forth anymore, the worry of unintentional collision to the outer tubular casing of the scope during moving the fingers is substantially eliminated.

Another object of the present invention is to provide a lens adjustment device for a scope, wherein the first controller of the lens adjustment device is able to operatively drive the first lens group and the second lens group simultaneously, while a second controller is set specifically for controlling the second lens group for another specific purpose, such as functioning as the fine turning of the optical parameters of the optical lens groups.

Another object of the present invention is to provide a lens adjustment device for a scope, wherein the user is capable of altering the position of the first lens group and the second lens group simultaneously or merely changing the relative position of the second group lens, so that the controlling mode of the lens adjusting device is selectable so as to enhance the adjusting efficiency and simplifying the adjusting operation thereof.

Another object of the present invention is to provide a lens adjustment device for a scope, wherein the first lens group further comprises a first lens and a second lens spaced and coaxially mounted with the first lens along the eyepiece end portion of the tubular body of the lens adjustment device, which is arranged in such a manner that when the first controller is actuated, the relative distance between the first lens and the second lens is altered thereby for shifting the optical feature, such as the magnifying power, of the second lens group.

According to the present invention, the foregoing and other objects and advantages are attained by providing a lens adjustment device for a firearm scope, which comprises:

an elongated tubular scope body having an objective end portion and an eyepiece end portion;

a first lens group and a second lens group slidably and operatively assembled at the objective end portion and the eyepiece end portion respectively;

a first controller arranged to control the first lens group and the second lens group; and a second controller arranged to control the second lens group individually, wherein the first controller and the second controller are arranged adjacently with each other at the scope body.

According to one or more embodiments of the present invention, the tubular scope body of the lens adjusting device further comprises:

a first tubular member defining the objective end portion and the eyepiece end portion of the tubular body, wherein the first lens group is slidably mounted along a first elongated sliding slot via a first driving element affixed to the first lens group and the second lens group is slidably mounted along a second elongated sliding slot via a second driving element affixed to the second lens group;

a second tubular member rotatably engaged between the objective end portion and the eyepiece end portion of the first tubular member, wherein a second guiding rail is provided along an outer wall of the second tubular member and the first driving element of the first lens group is slidably engaged between two inner walls of the second guiding rail; and a third tubular member rotatably and operatively coupled on the objective end portion of the first tubular member, wherein a third guiding rail is provided along an outer wall of the third tubular member and the second driving element of the second lens group is engaged between two inner walls of the third guiding rail, wherein the first tubular member, the second tubular member and the third tubular member are arranged in such a manner that when the second tubular member is actuated via the first controller, the first tubular member is driven to rotate along a rotation axial so as to shift positions of the first lens group and the second lens group lens group respectively and the relative position of the first lens group and the second lens group simultaneously.

According to one or more embodiments of the present invention, when the second tubular member is actuated via the first controller, the first sliding slot of the first tubular member is rotated along the rotation axial to drive the first driving element of the first lens group to spirally and downwardly/upwardly move along the second guiding rail of the second tubular member thereby shifting the first lens group upwardly/downwardly, and to drive the second driving element of the second lens group to spirally and downwardly/upwardly move along the third guiding rail of the third tubular member thereby shifting the second lens group upwardly/downwardly at the same time.

According to one or more embodiments of the present invention, wherein the third tubular lens has a coupling end rotatably and operatively coupled on the objective end portion of the first tubular member and a actuation end coaxially extended to a position close to the first controller, such that the second controller affixed to the actuation end of the third tubular member is arranged adjacent to the first controller.

According to one or more embodiments of the present invention, when the third tubular member is actuated via the second controller, the third tubular member is driven to rotate along the rotation axial so as to drive the second driving element carrying the second lens group to spirally and downwardly/upwardly move along the third guiding rail of the third tubular member.

According to one or more embodiments of the present invention, the first lens group comprises a first lens and a second lens, each further comprising a first driving unit slidably engaging with the first sliding slot of the first tubular member and the two second guiding rail units of the second guiding rail respectively, which are spacedly formed along the outer wall of the second tubular member, such that when the first controller is actuated, the relative distance between the first lens and the second lens is altered thereby altering the optical feature of the first lens group.

According to one or more embodiments of the present invention, the first lens group comprises at least a third lens, which comprises a second driving unit for slidably engaging with the second sliding slot of the first tubular member and the third guiding rail of the second guiding rail, such that the third tubular is actuated via the first controller or the second controller, the position of the third lens is altered thereby altering the optical features of the lens adjustment device.

According to one or more embodiments of the present invention, wherein the first controller and the second controller are embodied as ring-shaped turning knobs respectively, which are mounted adjacently side to side with each other on the scope, such as a firearm scope.

According to one or more embodiments of the present invention, wherein a securing member is provided on the periphery of the first driving element, so that when the first driving member is engaged into the inner walls of the second guiding rail, the securing member provided between the second guiding rail and the first driving member is slightly deformed so as to form a tighter engagement between the first driving member and the second guiding rail, respectively.

According to one or more embodiments of the present invention, wherein the lens adjustment device further comprises a reticle member mounted in the eyepiece end portion of the tubular body for precisely locating the target while assisting the shooting.

According to one or more embodiments of the present invention, wherein the reticle further defines a horizontal and a vertical guiding grid for particularly pinpointing the targeted object.

According to another aspect of the present invention, a scope for a firearm is provided, wherein the scope further comprises:

an outer tubular casing having a first end portion and an second end portion and forming an tubular chamber extended between the first end portion and the second end portion; and a lens adjustment device mounted within the tubular cavity of the outer tubular casing, wherein the controllers of the lens adjustment device are adjacently mounted on the surrounding wall of the outer tubular casing.

According to one or more embodiments of the present invention, the scope further comprises a protection lens provided at the first and second end portions of the scope respectively for preventing dust and/or dirt entering into the tubular chamber.

These and other objectives, features, and advantages of the present invention will become apparent from the following detailed description, the accompanying drawings, and the appended claims.

Additional advantages and features of the invention will become apparent from the description which follows, and may be realized by means of the instrumentalities and combinations particularly point out in the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
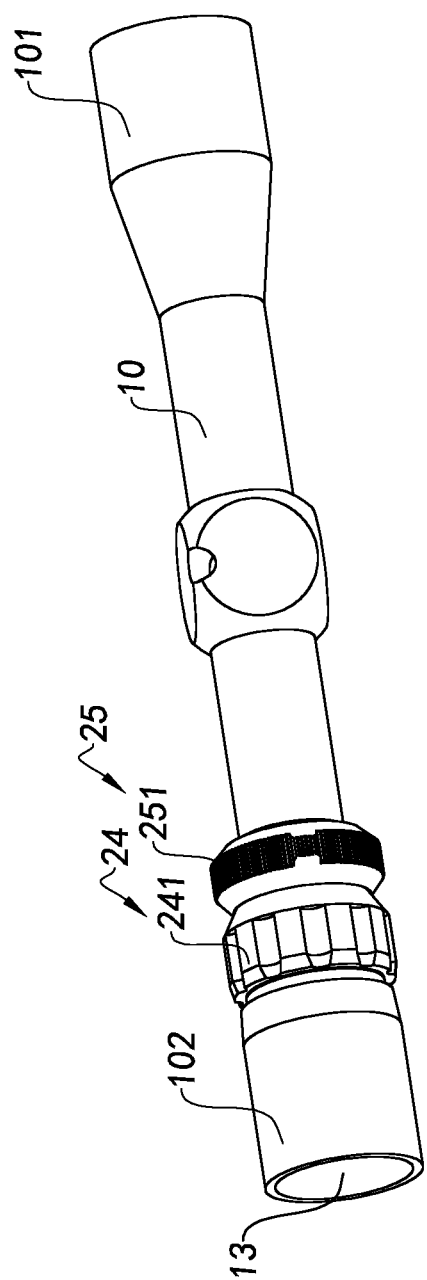
FIG. 1 is a perspective view of a scope according to a first preferred embodiment of the present invention.
Figure 2:
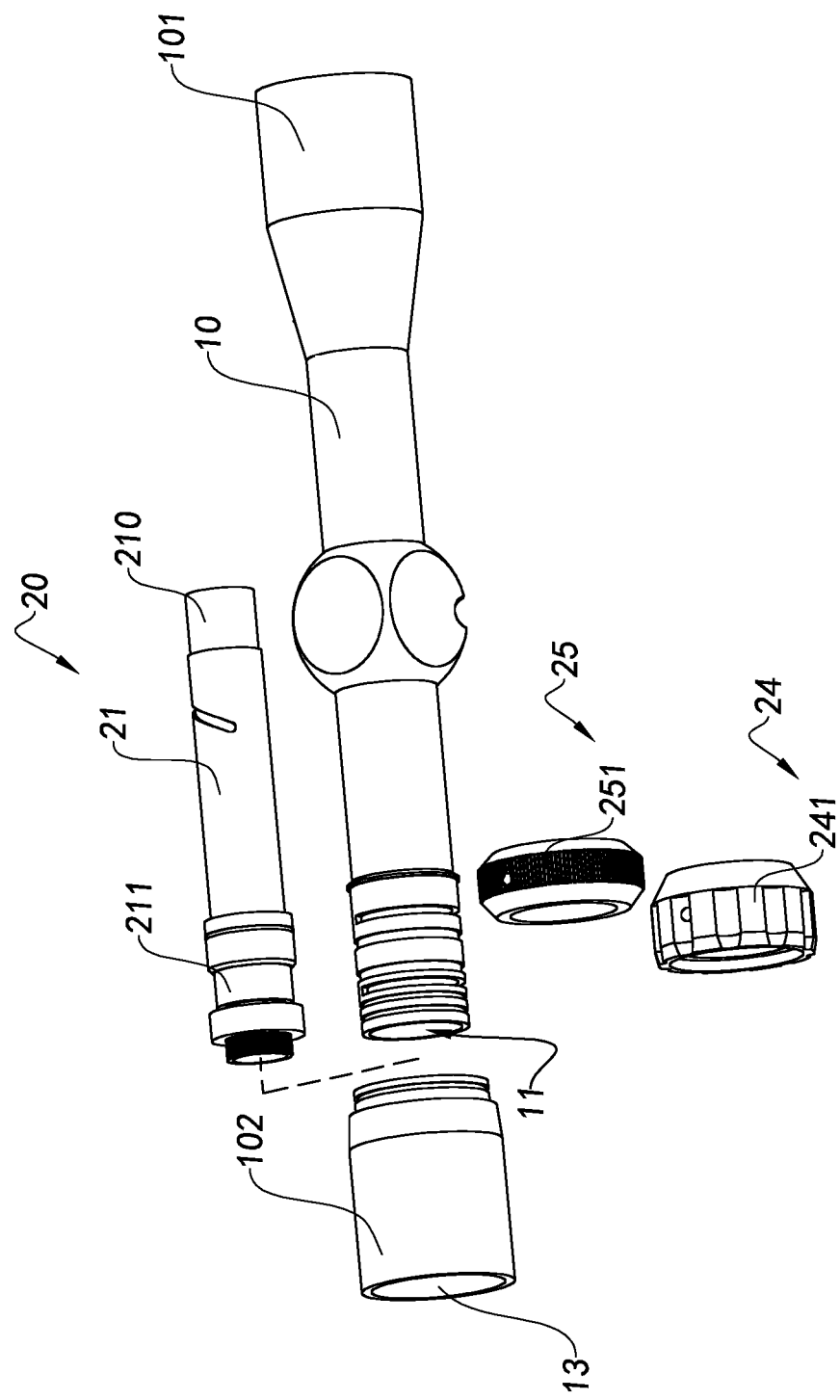
FIG. 2 is an exploded view of the scope according to the above first preferred embodiment of the present invention.
Figure 3:
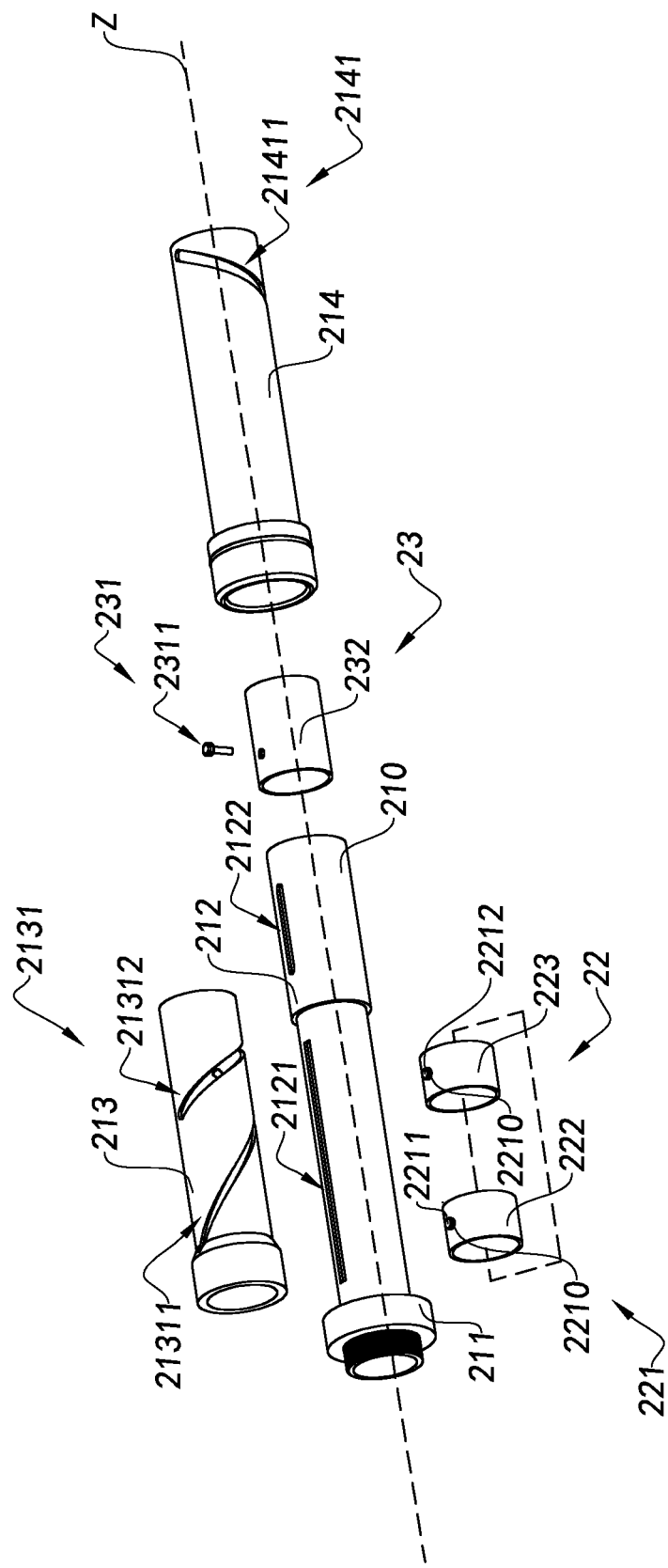
FIG. 3 is an exploded view of the lens adjustment device of the scope according to the above first preferred embodiment for the present invention.
Figure 4A:
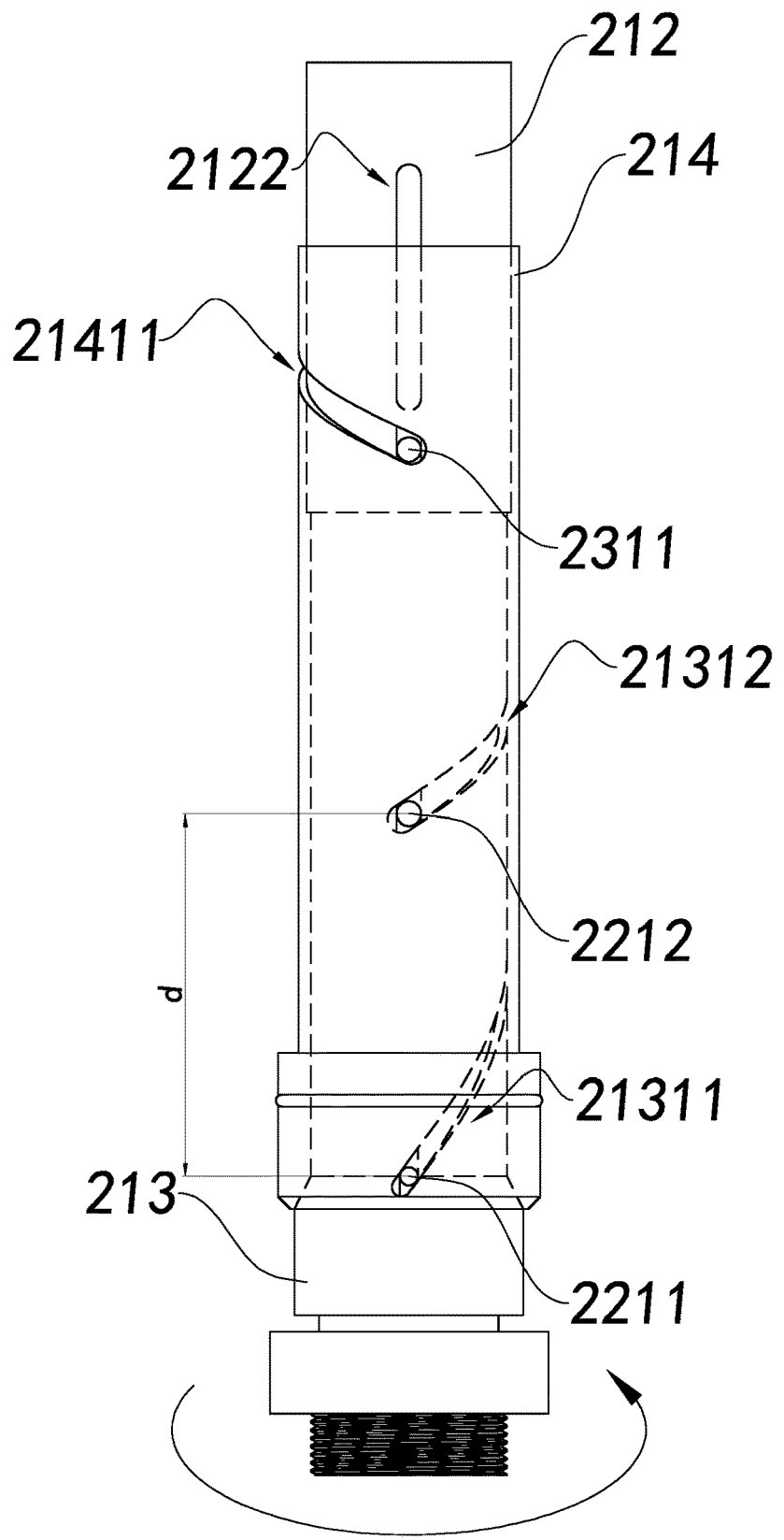
FIG. 4A is a schematic view of the lens adjustment device of the scope according to the above first preferred embodiment for the present invention, illustrating that the first lens group is controlled via the first controller to shift at the maximized-distance state.
Figure 4B:
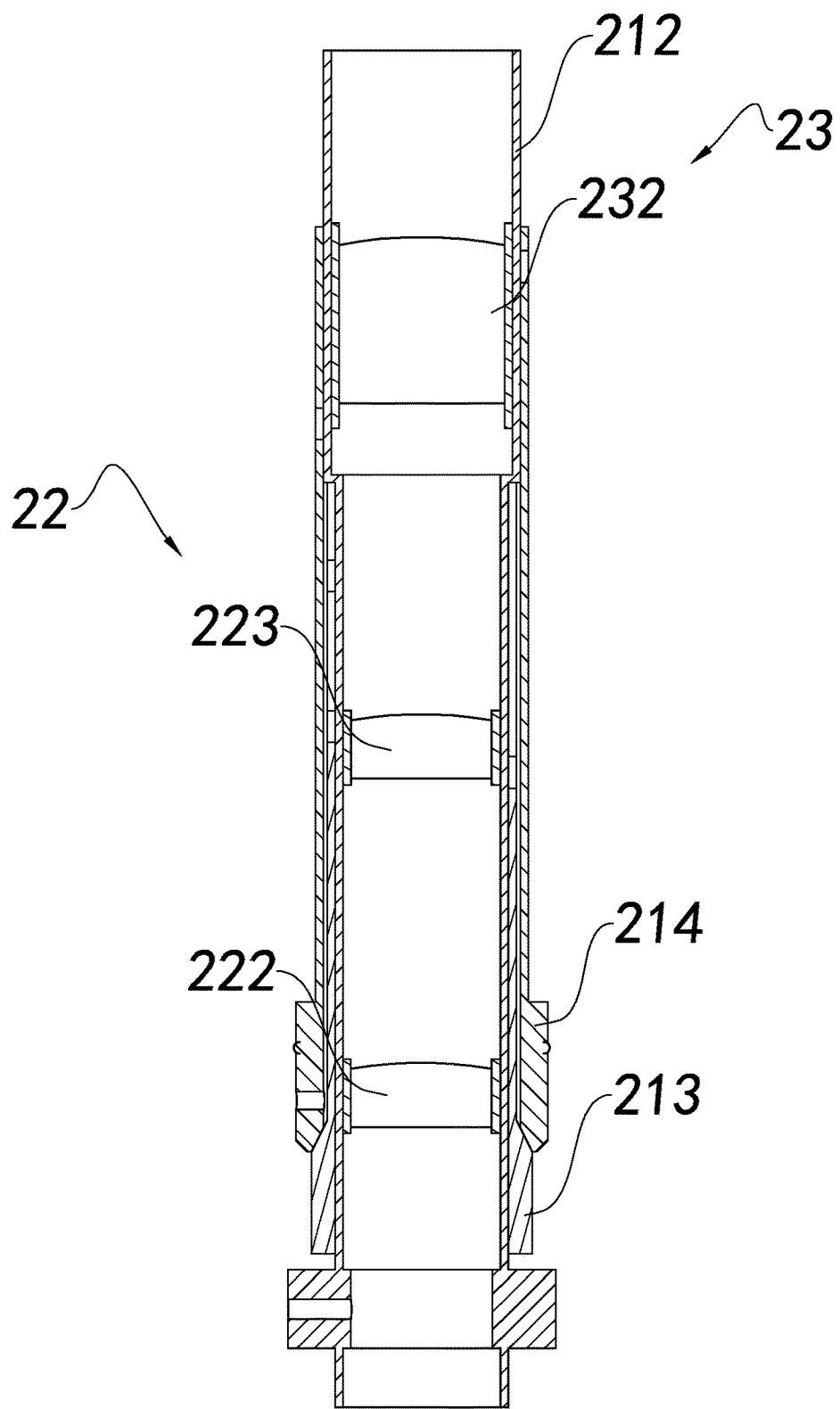
FIG. 4B is a sectional view of the lens adjustment device of the scope according to the above first preferred embodiment for the present invention, illustrating that the first lens group is controlled via the first controller to shift at the maximized-distance state.
Figure 5A:
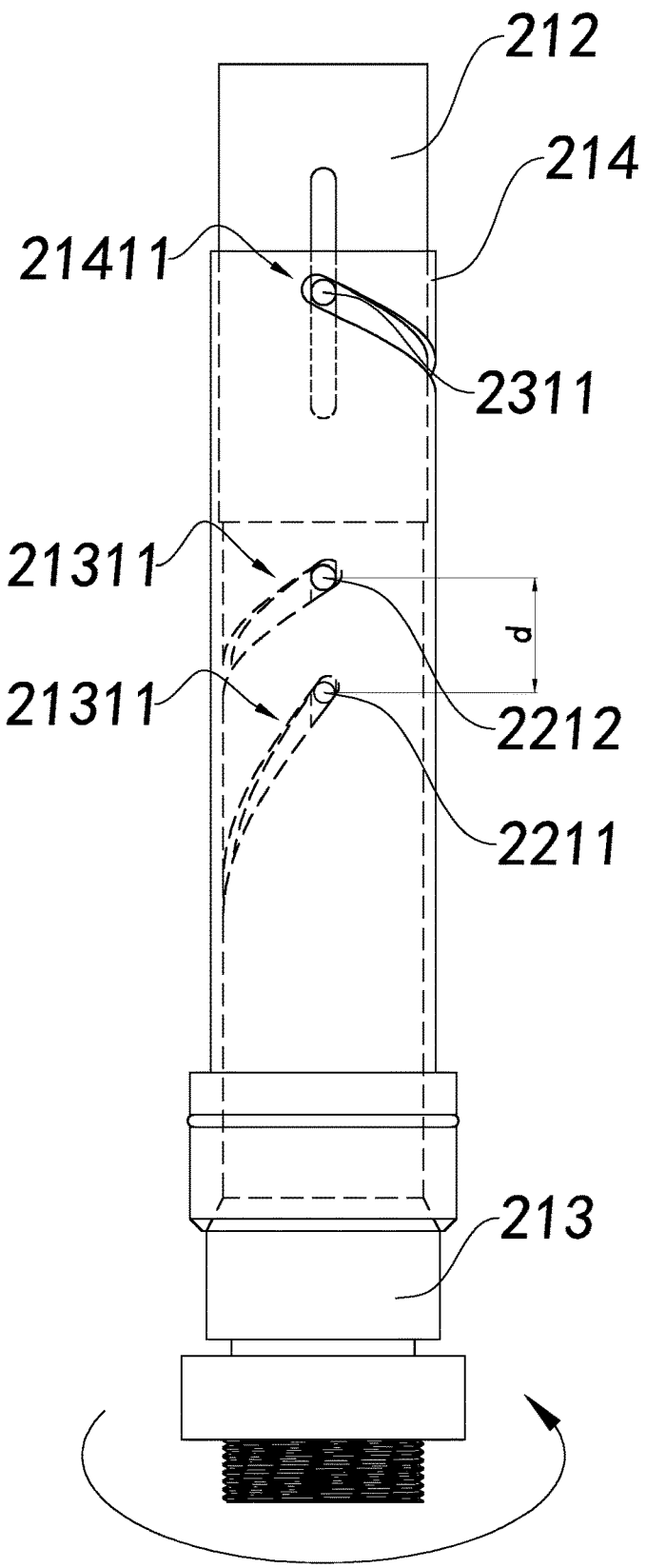
FIG. 5A is a schematic view of the lens adjustment device of the scope according to the above first preferred embodiment for the present invention, illustrating that the first lens group is controlled via the first controller to shift at the minimized-distance state.
Figure 5B:
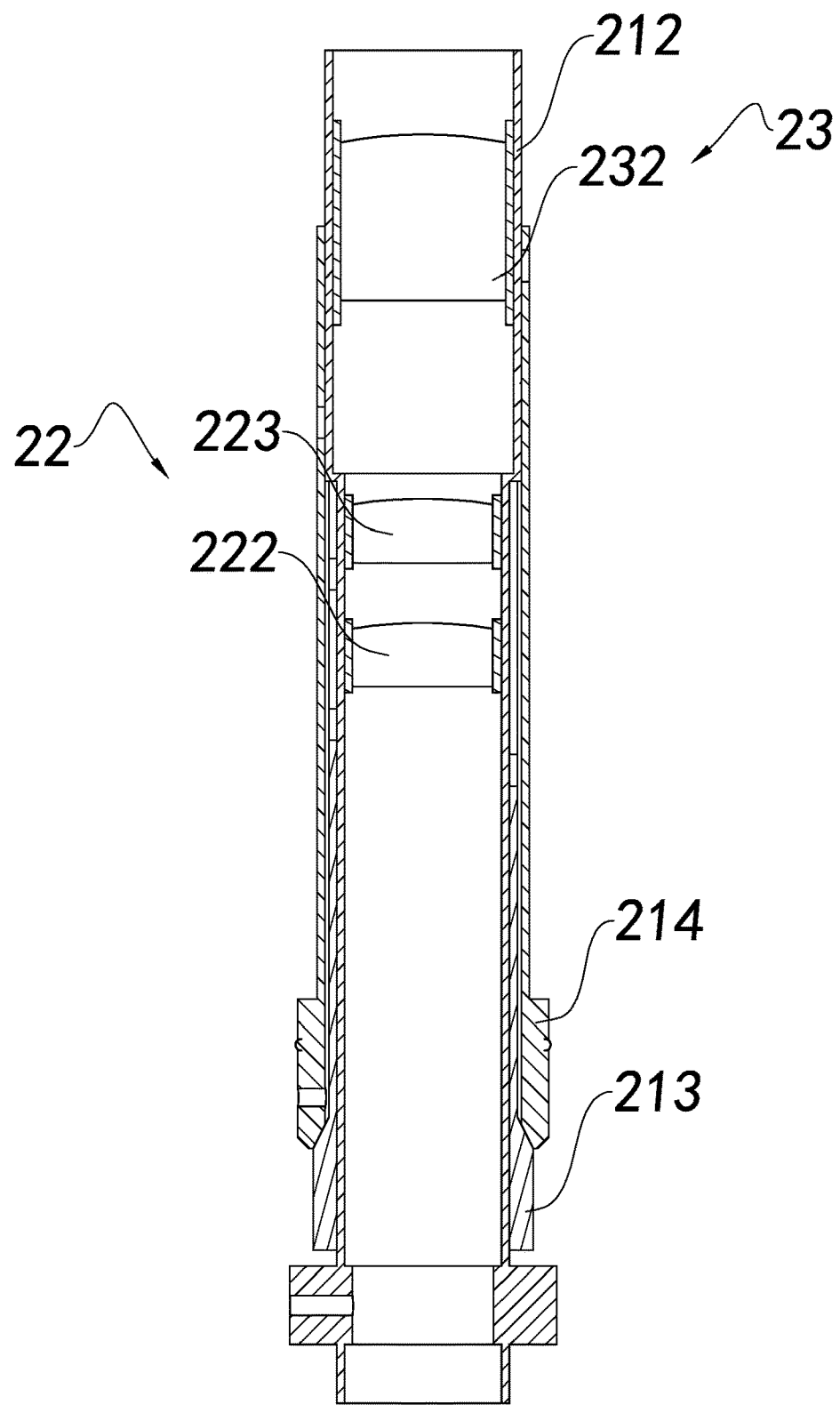
FIG. 5B is a sectional view of the lens adjustment of the scope according to the above first preferred embodiment for the present invention, illustrating that the first lens group is controlled via the first controller to shift at the minimized-distance state.
Figure 6A:
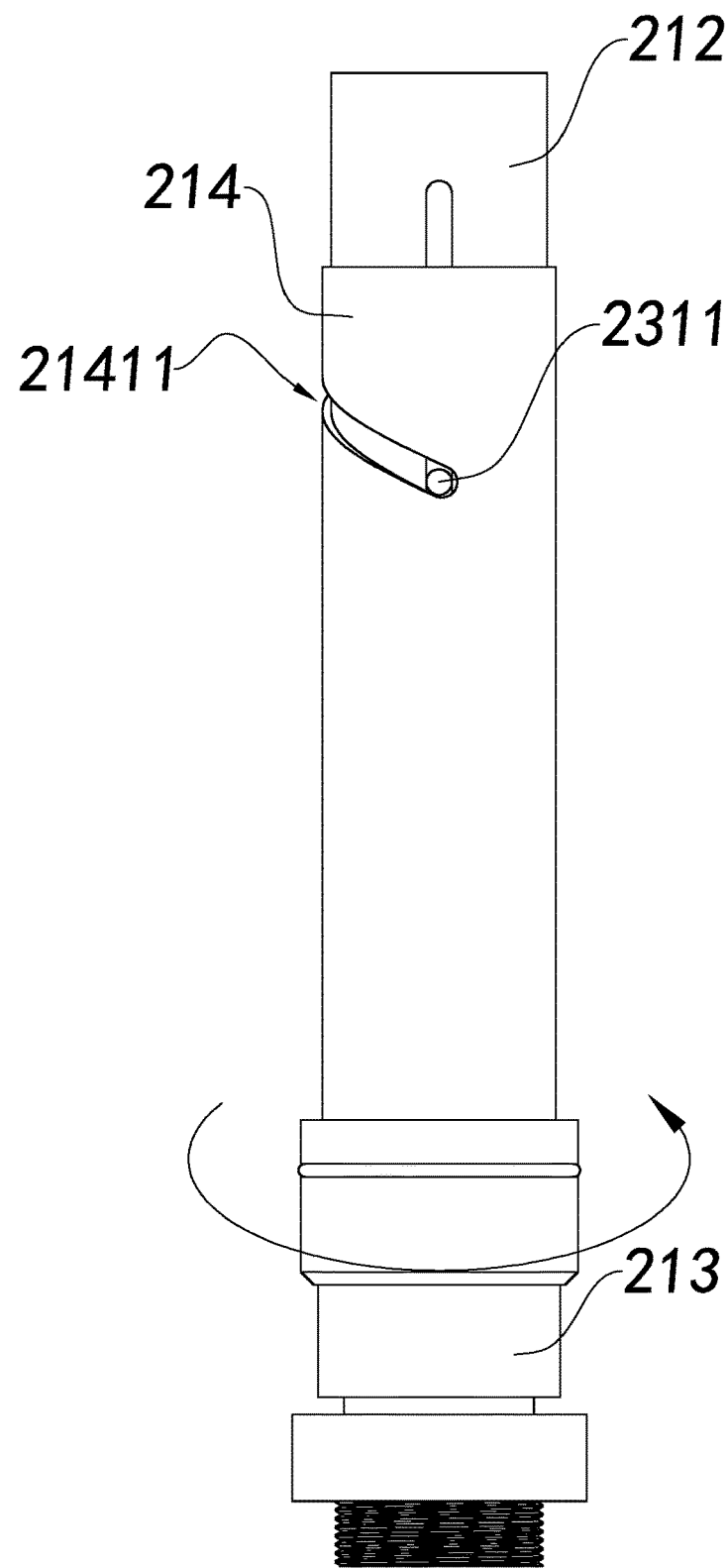
FIG. 6A is a schematic view of the lens adjustment device of the scope according to the above first preferred embodiment for the present invention, illustrating the movement the second lens group when the second controller is actuated.
Figure 6B:
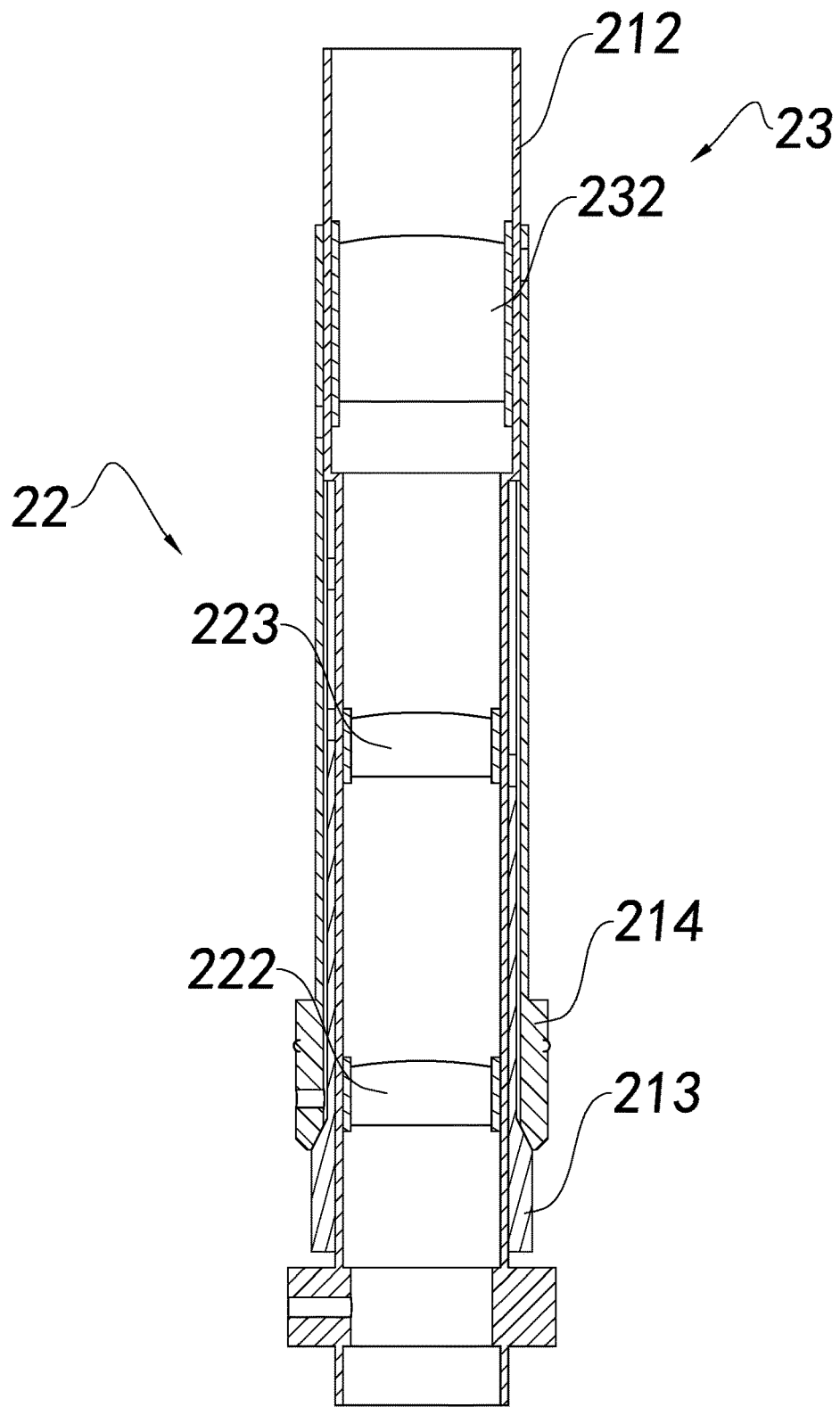
FIG. 6B is a sectional view of the lens adjustment of the scope according to the above first preferred embodiment for the present invention, illustrating that the first lens group is controlled via the first controller to shift at the minimized-distance state.
Figure 7A:
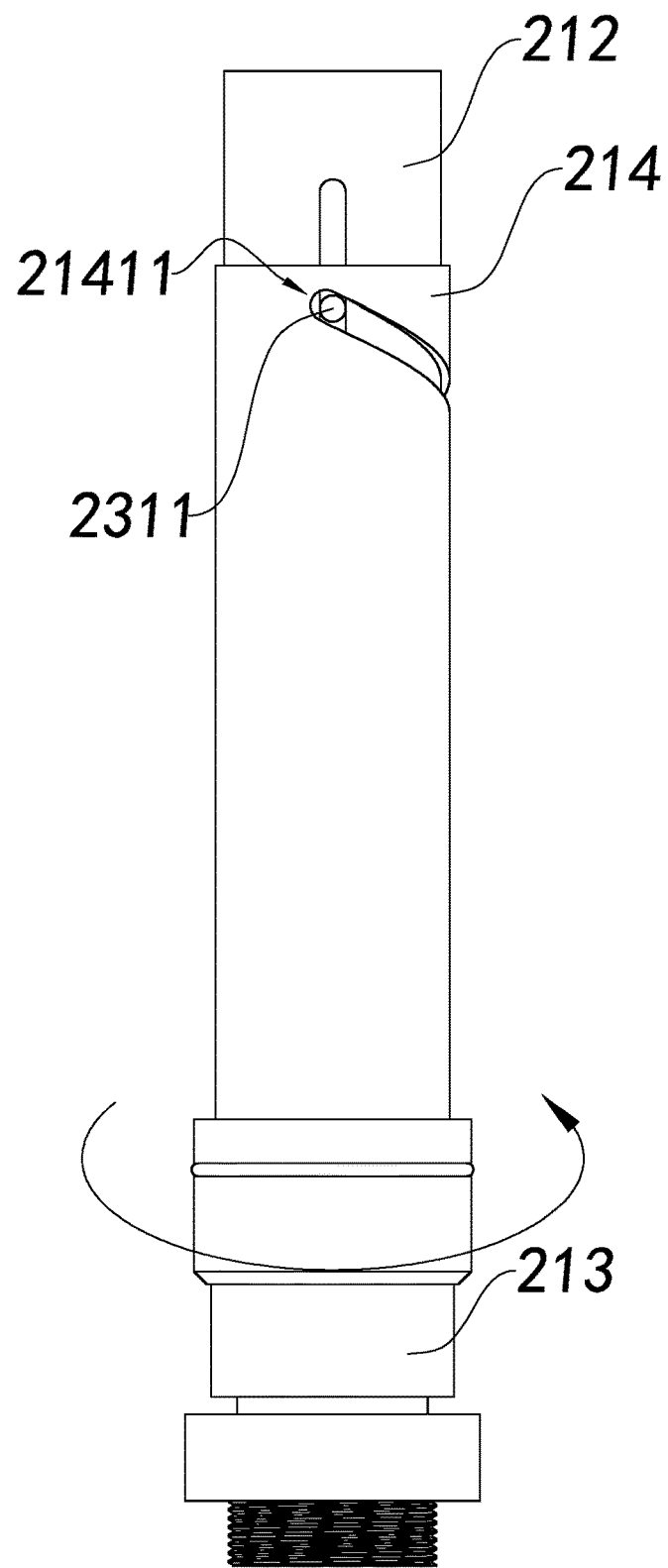
FIG. 7A is a schematic view of the lens adjustment device of the scope according to the above first preferred embodiment for the present invention, illustrating the movement the second lens group when the second controller is actuated.
Figure 7B:
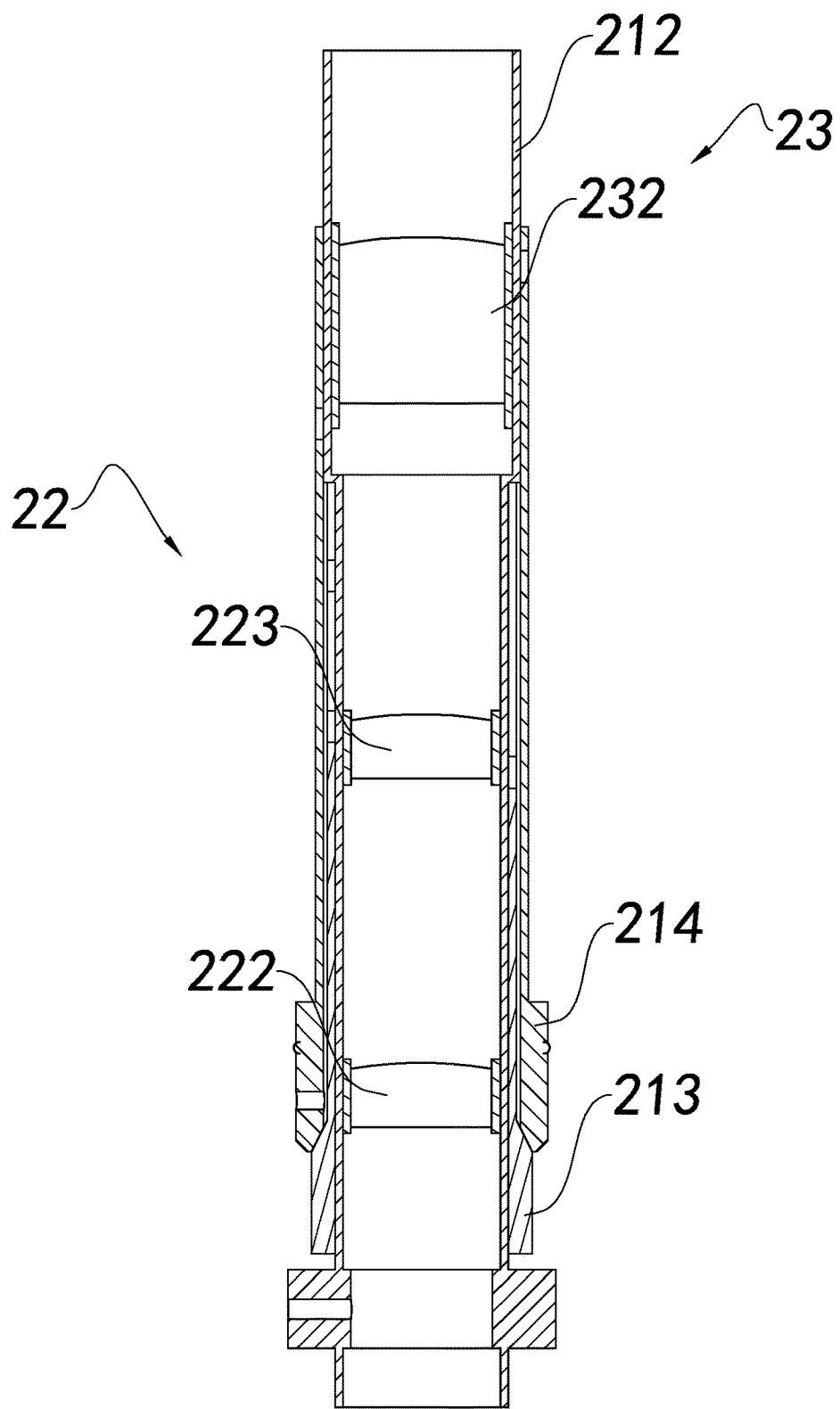
FIG. 7B is a sectional view of the lens adjustment device of the scope according to the above first preferred embodiment for the present invention, illustrating the movement the second lens group when the second controller is actuated.

Referring to FIG. 1 to FIG. 3 of the drawings, a scope according to a first preferred embodiment is illustrated, wherein the scope is a sighting device commonly incorporated with firearms, for example, to provide an accurate aiming point and to aid the operator in properly aligning a barrel of the firearm with a desired target.

Referring to the FIG. 1 and FIG. 2, the scope of the first preferred embodiment comprises an outer tubular casing 10 forming a tubular chamber 11 along a first end portion 101 and a second end portion 102 thereof, and a lens adjustment device 20 mounted within the tubular chamber 11, wherein the lens adjustment device 20 is adapted for acquiring an optical parameter of the scope for assisting the operator to accurately locate the target and perform the shooting.

Preferably, the scope further comprises two protection lenses 13 provided at the first end portion 101 and second end portion 102 of the scope respectively so that the lens adjustment device 20 is securely protected within the tubular chamber 11 while dust and/or dirt are kept outside by the protection lenses 13.

Referring to FIG. 3 of the drawings, the lens adjustment device 20 comprises an elongated tubular body 21, a first lens group 22, a second lens group 23, and a first controller, and a second controller. The elongated tubular body 21 has an objective end portion 210 and an eyepiece end portion 211, defining a rotation axial Z therealong. The first lens group 22 and the second lens group 23 are slidably and operatively assembled at the objective end portion 210 and the eyepiece end portion 211 respectively. The first controller 24 is arranged for controlling the first lens group 22 and the second lens group 23. The second controller 25 is arranged for controlling the second lens group 23 individually, wherein the first controller 24 and the second controller 25 are arranged adjacently side by side with each other at the outer tubular casing 10 of the scope, such that the optical parameters of the scope can be adjusted conveniently in one-hand operation for an operator.

More specifically, the tubular body 21 of the lens adjustment device 20 further comprises a first tubular member 212 defining the objective end portion 210 and the eyepiece end portion 211 of the tubular body 21 at the two end portions thereof, a second tubular member 213 rotatably engaged between the objective end portion 210 and the eyepiece end portion 211 of the first tubular member 212, and a third tubular member 214 rotatably and operatively coupled on the objective end portion 210 of the first tubular member 212, which are arranged in such a manner that when the second tubular member 213 is actuated via the first controller 24, the first tubular member 212 is driven to rotate along the rotation axial Z to change the locations of the first lens group 22 and the second lens group 23 respectively and the relative position of the first lens group 22 and the second lens group 23 simultaneously.

More specifically, the first lens group 22 is slidably mounted along a first elongated sliding slot 2121 longitudinally formed along the first tubular member 212 via a first driving element 221 affixed to the first lens group 22, such that the first lens group 22 is capable of altering its elevation along the first elongated sliding slot 2121 longitudinally when the first driving element 221 of the first lens group 22 is being actuated by an external force effect.

Accordingly, the second tubular member 213 is rotatably engaged between the objective end portion 210 and the eyepiece end portion 211 of the first tubular member 212, wherein a second guiding rail 2131 is formed along the second tubular member 213. The first driving element 221 of the first lens group 22 is arranged to protrude from the first sliding slot 2121 and slidably engaged between the two inner walls of the second guiding rail 2131, such that when the second tubular member 213 is actuated via the first controller 24 to rotate in relation to the rotation axial Z, the first driving element 221 is driven to move along the second guiding rail 2131 so as to carry the first lens group 22 to move along the first sliding slot 2121 in an up-and-down manner correspondingly. In other words, in this preferred embodiment, the external force effect is exerted via the interaction between the first driving element 221 and the second guiding rail 2131, thereby driving the first lens group 22 to change its position along the first elongated sliding slot 2121.

As shown in FIG. 2, the second lens group 23 is slidably mounted along a second elongated sliding slot 2131 via a second driving element 231 affixed to the second lens group 23, wherein the second elongated sliding slot 2131 is formed along the objective end portion 210 of the first tubular member 212. Similarly, the second lens group 23 is capable of altering its elevation along the second elongated sliding slot 2131, when the second driving element 231 of the second lens group 23 is driven by an external force effect.

Accordingly, the third tubular member 214 is rotatably and operatively coupled on the objective end portion 210 of the first tubular member 212 via the second driving element 231, wherein a third guiding rail 2141 is formed along the outer wall of the third tubular member 214 and aligned with the second elongated guiding slot. The second driving element 231 of the second lens group 23 is protruded out of the second elongated guiding slot and further be engaged between the two inner walls of the third guiding rail 2141, such that when the second tubular member 213 is actuated via the first controller 24 to rotate with respective to the rotation axial Z, the second driving element 231 is driven to move along the third guiding rail 2141 so as to carry the second lens group 23 to move along the second sliding slot 2122 upwardly or downwardly. In other words, the first controller 24 operatively controllably connected to the second tubular member 213 is able to alter the locations of the first lens group 22 and the second lens group 23 lens group respectively and the relative position of the first lens group 22 and the second lens group 23 simultaneously, thereby enhancing the adjusting efficiency of the lens adjustment device 20 while the adjusting operation thereof is substantially simplified at the same time.

It is important to mention that the second guiding rail 2131 of the second tubular member 213 is formed in a spiral-shape and aligned with the first elongated guiding slot 2121, such that when the second tubular member 213 is actuated to rotate along the rotation axial Z thereof, the first driving element 221 of the first lens group 22 is driven to spirally slide along the second guiding rail 2131. Accordingly, the spiral movement of the first driving element 221 guides the first lens group 212 to slide along the first guiding slot 2121 in an up-and-down manner so as to change the location thereof at the first tubular member 212. In other words, the first driving member 221 functions as a linking means for transferring the spiral movement of the first driving element into the sliding movement of the first lens group 22 along the first sliding slot 2121.

It is easily understandable that the sliding movement of the first lens group 22 can be modified according to specific needs via changing the parameters of the spiral guiding rail, such as the spiral direction and the lead of the spiral.

Similarly, the third guiding rail 2141 of the third tubular member 214 has a spiral-shape, such that when the second driving element 231 of the second lens group 22 is being driven to slide along the spiral third guiding rail 2141, the spiral movement of the second driving element 231 is transferred into the sliding movement of the second lens group 23 along the second sliding slot 2122 simultaneously so as to change the location of the second lens group 22 at the first tubular member 212. It is easily understandable that the sliding movement of the first lens group 22 can be modified according to specific needs via changing the parameters of the spiral guiding rail, such as the spiral direction and the lead of the spiral.

As shown in FIG. 3, a securing member 2210 is further provided on the periphery of the first driving element 221 for securely coupling the first driving element 221 in the second guiding rail 2131. In particular, when the first driving element 221 is engaged into the inner walls of the second guiding rail 2131, the securing member 2210 disposed between the guiding rail 2131 and first driving element 221 is slightly deformed to form a tighter engagement between the first driving element 221 and the second guiding rail respectively.

It is important to mention that the securing member 2210 arranged between the first driving element 221 and the second guiding rail 2131 serves as a buffering member to prevent direct friction therebetween to prolong the life span of the first driving element 221. Accordingly, the securing member 2210 is preferably made of wearable material.

Actuation endactuation end Furthermore, the third tubular member 214 has a coupling end rotatably and operatively coupled at the objective end portion 210 of the first tubular member 212 and an actuation end 2143 coaxially extended to a position close to the first controller 24, such that the second controller 25 is able to be mounted at a position adjacent to the first controller 24. Since the first and second controllers 24, 25 are arranged side by side, i.e. at the eyepiece end portion 211, the operator is able to grip his or her fingers at the first controller 24 and the second controller 25 at the same time for selectively operating the first controller 24 and the second controller 25 in a free manner, while allowing the user to simultaneously observe changes within the field of view in real time.

It is important to mention that since the first and second controllers 24, 25 of the lens adjustment device 20 are arranged adjacently, for example side by side with each other, the operator no longer needs to move his or her fingers (hands) back and forth anymore, hence the worry of unintentional collision to the outer tubular casing 10 of the scope while moving the fingers is substantially eliminated.

It is worth mentioning that the controllers, including the first controller 24 and the second controller 25, in the first preferred embodiment of the present invention are generally embodied as ring-shaped turning knobs 241, 251 respectively, which are mounted adjacently, for example side by side, with each other on the scope at a hand-reaching position. For example, the first controller 24 and the second controller 25 are preferably arranged at the second end portion 102 of the outer tubular casing 10 of the scope for convenient operation.

As shown in FIG. 3 of the drawings, the first lens group 22 further comprises a first lens 222 and a second lens 223, wherein each of the lenses 222, 223 further comprises a first driving unit 2211, 2212 for slidably engaging with the first sliding slot 2121 of the first tubular member 212. Correspondingly, two second guiding rail units 21311, 21312 of the second guiding rail 2131 are spacedly formed along the second tubular member 213 for allowing the first driving units 2211, 2212 of the lenses 222, 223 to be engaged between the two inner walls thereof respectively, such that when the second tubular member 213 is actuated, the first driving units 2211, 2212 are driven to spirally slide along the second guiding rail units 21311, 21312 so as to carry the first lens 222 and the second lens 223 to slide along the first sliding slot 2121 respectively.

Moreover, the second guiding rail units 21311, 21312 are substantially arranged in parallel with each other with different spiral parameters i.e. the lead thereof, such that when the first lens 222 and the second lens 223 of the first lens group 22 are driven along the spiral guiding rail units 21311, 21312 respectively, the optical length therebetween is changed accordingly. One skilled in the art would easily understand that since the optical distance of the lenses 222, 223 of the first lens group is changed, the optical feature, i.e. the magnifying power of the first lens group 22, is altered correspondingly.

More specifically, as shown in FIG. 4A to FIG. 5B of the drawings, the optical length between the first lens 222 and the second lens 223 at the second spiral guiding rail units 21311, 21312 is gradually minimized when the first driving units 2211, 2212 are spirally moved upwardly along the second spiral guiding rail units 21311, 21312 respectively via the first controller 24. Conversely, when the first driving units 2211, 2212 are spirally moved downwardly along the second spiral guiding rail units 21311, 21312, the optical length between the first lens and second lens 222, 223 at the second spiral guiding rail units 21311, 21312 is gradually maximized. In other words, the first lens group 22 is arranged to shift between a maximized-distance state and a minimized-distance state in turns when the second tubular member 213 is being rotated counterclockwise or clockwise correspondingly.

One skilled in the art would easily understand that the maximized-distance state and the minimized-distance state indicate two extreme optical features of the first lens group 22, i.e. the magnifying power thereof.

Furthermore, as shown in the FIG. 4A to FIG. 5B of the drawings, when the second tubular member 213 is actuated to drive the first lens group 22 to the minimized-distance state from the maximized-distance state, the second lens group 23 is spirally moved the second lens group 23 between an uppermost position and a lowermost position along the third guiding rail 2141 correspondingly. In this preferred embodiment, when the second tubular member 213 is actuated, the first lens group 22 and the second lens group 23 are moved simultaneously along their guiding rails respectively, and when the second lens group 23 reaches the uppermost position, the first lens group 22 is shifted to the minimized-distance state synchronously. Similarly, when the second tubular member 213 is actuated conversely, the first lens group 22 is shifted from the minimized-distance state to the maximized-distance state, while the second lens group 23 is moved from the uppermost position to the lowermost position correspondingly.

It is important to mention that the movement of the first lens group and the second lens group and the relative relationship between the first lens group and the second lens group can be actuated in other controlling manners, as long as the first and the second controllers are located side-by-side at a hand-reachable position. In addition, the optical features corresponding to the movements and the relative position between the first and second lens group can be modified according the specific needs of the operators.

Furthermore, as shown in the FIG. 3 of the drawings, the second lens group 23 comprises at least a third lens 232 which comprises a second driving unit 2311 for slidably engaging with the second sliding slot 2122 of the first tubular member 212 and a third guiding rail unit 21411 of the second guiding rail 2131, such that when the third tubular member 214 is actuated via the first controller 24 or the second controller 25, the position of the third lens 232 is shifted from the uppermost position and the lowermost position in turns for changing the optical performance of the lens adjustment device 20, as shown in FIG. 6A to FIG. 7B.

It is worth mentioning that, in one or more embodiment of the present invention, the lens adjustment device 20 further comprises a reticle member mounted in the eyepiece end portion 211 of the tubular body 21 for assisting the shooter in precisely locating the target.

Figure 8:
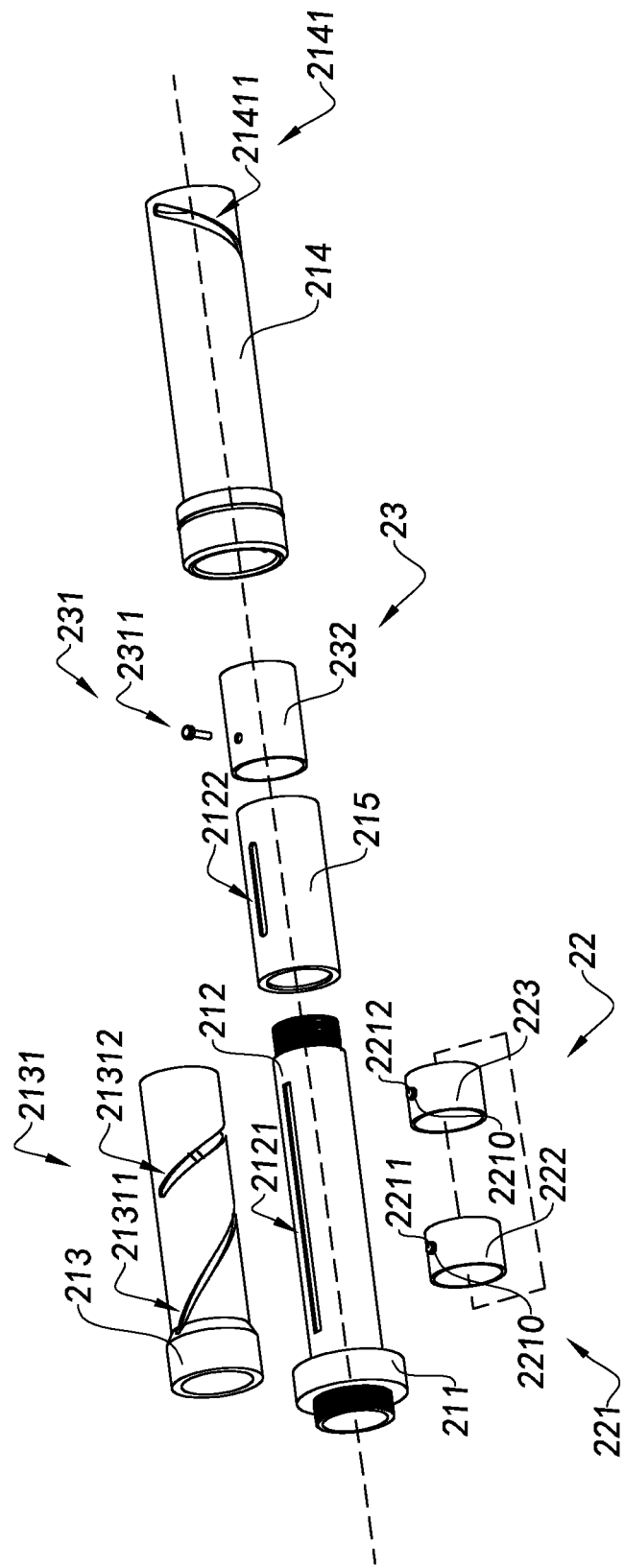
FIG. 8 is an exploded view of the lens adjustment device of the scope according to a second preferred embodiment of the present invention.

Referring to FIG. 8 of the drawings, a lens adjustment device 20 according to a second preferred embodiment of the present invention is illustrated, wherein the only difference existing between the lens adjustment device 20 of the first preferred embodiment and the second preferred embodiment is that the objective end portion 210 of the first tubular member 212 is replaced via a separated fourth tubular member 215 coupled with the first tubular member 212, wherein the second tubular member 213 is rotatably engaged between the fourth tubular member 215 and the eyepiece end portion 211 of the first tubular member 212.

It is worth mentioning that the fourth tubular member 215 can be affixed to the first tubular member 212 via threaded connection or any other type of mechanical connection, such as welding or adhesive attachment, which is capable of interconnecting the fourth tubular member 215 with the first tubular member 212.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A lens adjustment device for a scope, comprising:
an elongated tubular body having an objective end portion and an eyepiece end portion;
a first lens group and a second lens group slidably and operatively assembled at said objective end portion and said eyepiece end portion, respectively;
a first controller arranged for controlling said first lens group and said second lens group; and a second controller arranged for controlling said second lens group individually, wherein said first controller and said second controller are arranged adjacently with each other on said outer tubular casing of said scope so as to enable one-hand operation, wherein said tubular body of said lens adjustment device further comprises: a first tubular member defining said objective end portion and said eyepiece end portion of said tubular body; a second tubular member rotatably engaged between said objective end portion and said eyepiece end portion of said first tubular member; and a third tubular member rotatably and operatively coupled on said objective end portion of said first tubular member, such that when said second tubular member is actuated via said first controller operatively connected to said second tubular member, said first tubular member is driven to rotate along said rotation axial so as to shift said positions of said first lens group and said second lens group lens group respectively and said relative position of said first lens group and said second lens group simultaneously.

2. The lens adjustment device for a scope, as recited in claim 1, wherein said first lens group is slidably mounted along a first elongated sliding slot via a first driving element affixed to said first lens group, wherein a second guiding rail is formed along said second tubular member and said first driving element of said first lens group is arranged to protrude from said first guiding slot and slidably engaged between said two inner walls of said second guiding rail, such that when said second tubular member is actuated via said first controller to rotate respective to said rotation axial, said first driving member is driven to move along said second guiding rail so as to carry said first lens group to move along said first sliding slot upwardly or downwardly.

3. The lens adjustment device for a scope, as recited in claim 1, wherein said second lens group is slidably mounted along a second elongated sliding slot via a second driving element affixed to said second lens group, wherein said second elongated sliding slot is formed along said objective end portion of said first tubular member, wherein a third guiding rail is formed along said outer wall of said third tubular member and said second driving element of said second lens group is further engaged between said two inner walls of said third guiding rail, such that when said second tubular member is actuated via said first controller to rotate with respective to said rotation axial, said second driving member is driven to move along said third guiding rail so as to carry said second lens group to move along said second sliding slot upwardly or downwardly.

4. The lens adjustment device for a scope, as recited in claim 2, wherein said second lens group is slidably mounted along a second elongated sliding slot via a second driving element affixed to said second lens group, wherein said second elongated sliding slot is formed along said objective end portion of said first tubular member, wherein a third guiding rail is formed along said outer wall of said third tubular member and said second driving element of said second lens group is further engaged between said two inner walls of said third guiding rail, such that when said second tubular member is actuated via said first controller to rotate with respective to said rotation axial, said second driving member is driven to move along said third guiding rail so as to carry said second lens group to move along said second sliding slot upwardly or downwardly.

5. The lens adjustment device for a scope, as recited in claim 4, wherein a securing member is provided on said periphery of said driving members for forming a tighter engagement between said driving members and said guiding rails respectively.

6. The lens adjustment device for a scope, as recited in claim 1, wherein said third tubular lens has a coupling end rotatably and operatively coupled on said objective end portion of said first tubular member and a actuation end coaxially extended to a location close to said first controller.

7. The lens adjustment device for a scope, as recited in claim 3, wherein said third tubular lens has a coupling end rotatably and operatively coupled on said objective end portion of said first tubular member and a actuation end coaxially extended to a location close to said first controller.

8. The lens adjustment device for a scope, as recited in claim 5, wherein said third tubular lens has a coupling end rotatably and operatively coupled on said objective end portion of said first tubular member and a actuation end coaxially extended to a location close to said first controller.

9. The lens adjustment device for a scope, as recited in claim 2, wherein said first lens group comprises a first lens and a second lens, wherein each of the lenses further comprises a first driving unit for slidably engaging with said first sliding slot of said first tubular member; two second guiding rail units of said second guiding rail are spaced along said second tubular member for allowing said first driving units of said lenses to be engaged between said two inner walls of said second guiding rail units respectively, in such a manner that when said second tubular member is being actuated, said first driving units are driven to spirally slide along said second guiding rail units so as to carry said first lens and said second lens to slide along said first sliding slot, respectively.

10. The lens adjustment device for a scope, as recited in claim 8, wherein said first lens group comprises a first lens and a second lens, wherein each of said first and second lenses further comprises a first driving unit for slidably engaging with said first sliding slot of said first tubular member, wherein two second guiding rail units of said second guiding rail are spaced along said second tubular member for allowing said first driving units of said lenses to be engaged between said two inner walls of said second guiding rail units, respectively.

11. The lens adjustment device for a scope, as recited in claim 10, wherein said second guiding rail units are arranged in parallel with each other with different spiral parameters especially for said lead thereof.

12. The lens adjustment device for a scope, as recited in claim 11, wherein said second guiding rail units are arranged in parallel with each other with different spiral parameters especially for said lead thereof.

13. The lens adjustment device for a scope, as recited in claim 12, wherein said distance between said first lens and said second lens along said longitudinal direction of said spiral guiding rail units is minimized gradually when said first driving units are driven upwardly along said spiral guiding rails units, respectively.

14. The lens adjustment device for a scope, as recited in claim 4, wherein said second lens group comprises at least a third lens, which comprises a second driving unit for slidably engaging with said second sliding slot of said first tubular member and a third guiding rail unit of said second guiding rail.

15. The lens adjustment device for a scope, as recited in claim 8, wherein said second lens group comprises at least a third lens, which comprises a second driving unit for slidably engaging with said second sliding slot of said first tubular member and a third guiding rail unit of said second guiding rail.

16. A scope with lens adjustment device for a firearm, comprising:
    an outer tubular casing having a first end portion and a second end portion and forming an tubular chamber extended from said first end portion and said second end portion therealong; and
    a lens adjustment device, which is mounted within said tubular cavity of said outer tubular casing, comprising an elongated tubular body having an objective end portion and an eyepiece end portion, a first lens group and a second lens group slidably and operatively assembled at said objective end portion and said eyepiece end portion respectively, a first controller arranged for controlling said first lens group and said second lens group, and a second controller arranged for controlling said second lens group individually, wherein said first controller and said second controller are arranged adjacently with each other on said outer tubular casing of said scope so as to enable one-hand operation, wherein said tubular body of said lens adjustment device further comprises: a first tubular member defining said objective end portion and said eyepiece end portion of said tubular body; a second tubular member rotatably engaged between said objective end portion and said eyepiece end portion of said first tubular member; and a third tubular member rotatably and operatively coupled on said objective end portion of said first tubular member, such that when said second tubular member is actuated via said first controller operatively connected to said second tubular member, said first tubular member is driven to rotate along said rotation axial so as to shift said positions of said first lens group and said second lens group respectively and said relative position of said first lens group and said second lens group simultaneously.

17. The scope with lens adjustment device for firing, as recited in claim 16, wherein said first lens group is slidably mounted along a first elongated sliding slot via a first driving element affixed to said first lens group, wherein a second guiding rail is formed along said second tubular member and said first driving element of said first lens group is arranged to protrude from said first guiding slot and slidably engaged between said two inner walls of said second guiding rail, such that when said second tubular member is actuated via said first controller to rotate respective to said rotation axial, said first driving member is driven to move along said second guiding rail so as to carry said first lens group to move along said first sliding slot upwardly or downwardly.

18. The scope with lens adjustment device for firing, as recited in claim 16, wherein said second lens group is slidably mounted along a second elongated sliding slot via a second driving element affixed to said second lens group, wherein said second elongated sliding slot is formed along said objective end portion of said first tubular member, wherein a third guiding rail is formed along said outer wall of said third tubular member and said second driving element of said second lens group is further engaged between said two inner walls of said third guiding rail, such that when said second tubular member is actuated via said first controller to rotate with respective to said rotation axial, said second driving member is driven to move along said third guiding rail so as to carry said second lens group to move along said second sliding slot upwardly or downwardly.

19. The scope with lens adjustment device for firing, as recited in claim 17, wherein said second lens group is slidably mounted along a second elongated sliding slot via a second driving element affixed to said second lens group, wherein said second elongated sliding slot is formed along said objective end portion of said first tubular member, wherein a third guiding rail is formed along said outer wall of said third tubular member and said second driving element of said second lens group is further engaged between said two inner walls of said third guiding rail, such that when said second tubular member is actuated via said first controller to rotate with respect to said rotation axis, said second driving member is driven to move along said third guiding rail so as to carry said second lens group to move along said second sliding slot upwardly or downwardly.

* * * * *